US008821327B1

United States Patent
Stade et al.

(10) Patent No.: US 8,821,327 B1
(45) Date of Patent: Sep. 2, 2014

(54) ENGINE ACCESSORY MOUNT FOR IMPROVED STRETCH BELT INSTALLATION

(71) Applicant: GM Global Technology Operations LLC, Detroit, MI (US)

(72) Inventors: Paul A. Stade, Shelby Township, MI (US); Michael David Lanier, Troy, MI (US); Ricky M. Graves, Southfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/777,439

(22) Filed: Feb. 26, 2013

(51) Int. Cl.
| *F16H 7/22* | (2006.01) |
| *F16H 7/14* | (2006.01) |
| *F16H 7/02* | (2006.01) |
| *F16H 55/30* | (2006.01) |

(52) U.S. Cl.
CPC ........................................ *F16H 7/14* (2013.01)
USPC ........... 474/110; 474/101; 474/115; 474/148; 474/152; 474/166; 123/198 E; 123/198 R; 123/198 D

(58) Field of Classification Search
USPC ....... 123/198 E, 198 R, 198 D; 474/101, 112, 474/113, 117, 115, 119, 133, 135, 148, 152, 474/166, 110
See application file for complete search history.

(56) References Cited

U.S. PATENT DOCUMENTS

| 630,833 | A | * | 8/1899 | Johnston | 474/113 |
| 3,306,121 | A | * | 2/1967 | Jenkins | 474/117 |
| 3,922,927 | A | * | 12/1975 | Shiki et al. | 474/113 |
| 4,023,428 | A | * | 5/1977 | Dysard | 474/113 |
| 5,938,169 | A | * | 8/1999 | Ogawa et al. | 248/674 |
| 6,083,131 | A | * | 7/2000 | Katogi et al. | 474/110 |
| 6,607,459 | B1 | * | 8/2003 | Serkh et al. | 474/138 |
| 2003/0017895 | A1 | * | 1/2003 | Baker | 474/114 |
| 2009/0298631 | A1 | * | 12/2009 | Jud et al. | 474/237 |

* cited by examiner

*Primary Examiner* — Lindsay Low
*Assistant Examiner* — Tea Holbrook
(74) *Attorney, Agent, or Firm* — Harness, Dickey & Pierce, P.L.C.

(57) ABSTRACT

An engine includes an engine structure defining a plurality of cylinders. A crankshaft is rotatably mounted to the engine structure and a plurality of pistons are each disposed in a corresponding one of the plurality of cylinders and drivingly connected to the crankshaft. A drive pulley is drivingly connected to the crankshaft. An accessory is mounted to the engine structure and includes a driven pulley connected to the drive pulley by a belt. The belt has a load direction extending through an axis of rotation of the drive pulley and the driven pulley. The accessory includes a housing having two slots extending generally parallel to the load direction of the belt and each receiving a fastener therein. A tensioner bolt is located between the two slots and extends generally parallel to the load direction to apply a tension force on the housing in the load direction.

18 Claims, 3 Drawing Sheets

ENGINE ACCESSORY MOUNT FOR IMPROVED STRETCH BELT INSTALLATION

FIELD

The present disclosure relates to engine accessory mounts, and more particularly, to an engine accessory mount for improved stretched belt installation.

BACKGROUND

This section provides background information related to the present disclosure which is not necessarily prior art.

Engine accessories such as vacuum pumps, compressors, external water pumps, power steering pumps, idlers, and generators can be driven by a belt that is driven by the crankshaft, either directly or indirectly. In order to function properly, the belt needs to be appropriately tensioned between a drive pulley and a driven pulley wherein the drive pulley is drivingly connected to the crankshaft of the engine and the driven pulley is mounted to a shaft of the accessory. Current accessory mount designs include a pivot hole provided on the accessory housing and a radial slot that allows the accessory housing to be pivoted about a pin received in the pivot hole. A fastener is provided for tightening the accessory housing in a fixed position once the belt is properly tensioned. A tensioner bolt can be utilized for applying a tensioning force against the housing of the accessory so that the fastener can be tightened along the radial slot in a desired position with an appropriate amount of belt tensioning.

A problem with this design is that the current design does not allow proper tension bolt tightening since the tension bolt tightens in a straight line while the radial slot has an arcuate travel path that it must follow. Therefore, the straight tensioning bolt and arcuate slot lead to binding issues that can prevent the belt from being tensioned properly.

Accordingly, is desirable to provide a simple and easy installation of a stretch belt on an engine accessory without compromising the intended life of either the belt or bearing in the accessory component.

SUMMARY

This section provides a general summary of the disclosure, and is not a comprehensive disclosure of its full scope or all of its features.

The present disclosure provides an engine having an engine structure defining a plurality of cylinders. A crankshaft is rotatably mounted to the engine structure and a plurality of pistons are each disposed in a corresponding one of the plurality of cylinders and drivingly connected to the crankshaft. A drive pulley is drivingly connected to the crankshaft. An accessory is mounted to the engine structure and includes a driven pulley connected to the drive pulley by a belt. The belt has a load direction extending through an axis of rotation of the drive pulley and the driven pulley. The accessory includes a housing having two slots extending generally parallel to the load direction of the belt and each receiving a fastener therein. A tensioner bolt is located between the two slots and extends generally parallel to the load direction to apply a tension force on the housing in the load direction.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
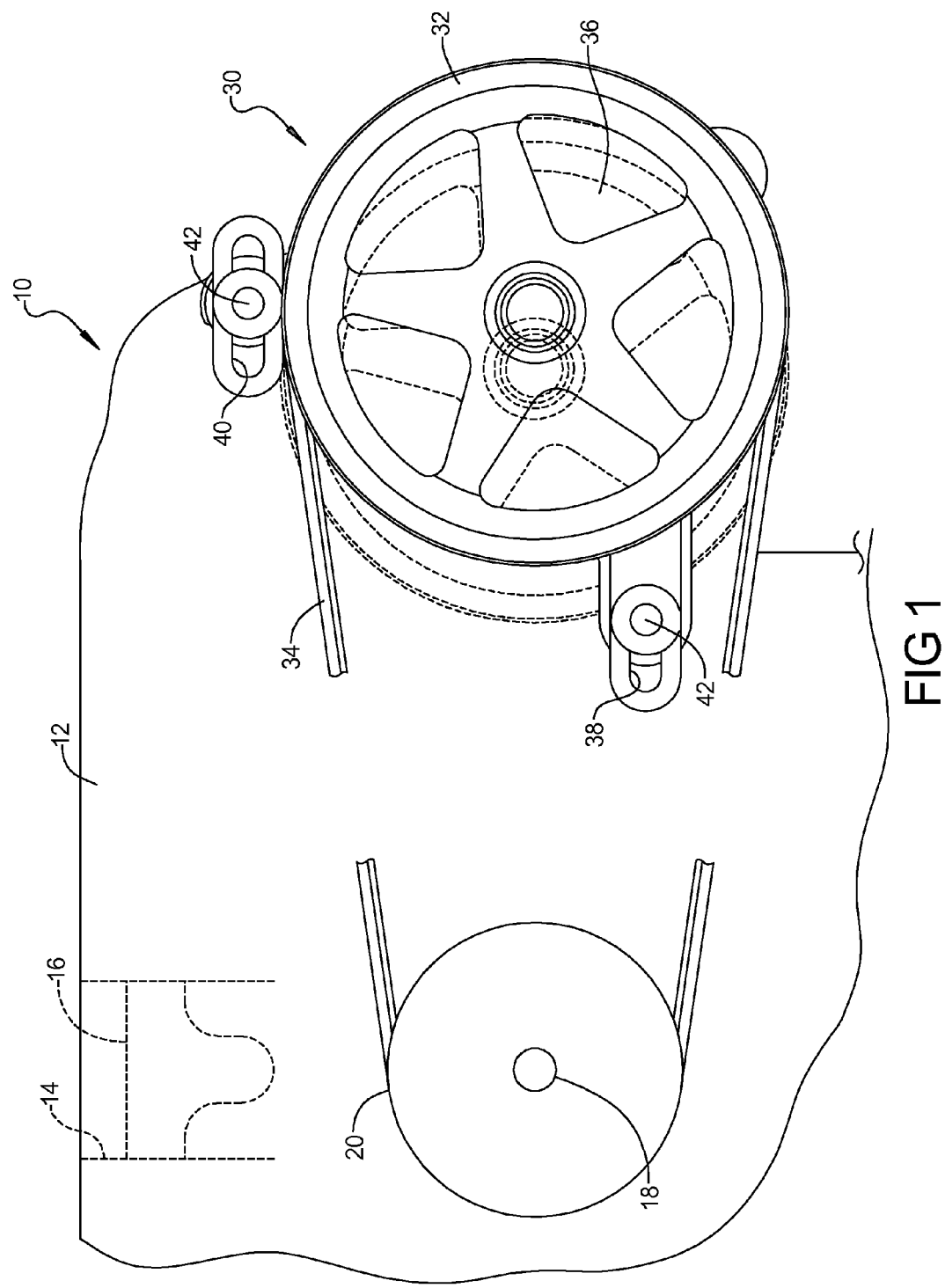
FIG. 1 is a front plan view of an engine and an accessory mounted thereto having the accessory mount according to the principles of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms.

These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIG. 1, the accessory mount according to the principles of the present disclosure will now be described. As shown in FIG. 1, an engine 10 is provided including an engine structure 12 having a plurality of cylinders 14 which each receive a piston 16 that is drivingly connected to a crankshaft 18, as is known in the art. The crankshaft 18 is drivingly connected to a drive pulley 20 that is either directly connected to the crankshaft 18, or indirectly driven by the crankshaft 18. An accessory 30 is mounted to the engine structure 12 and includes a driven pulley 32 for driving the accessory 30.

The accessory 30 can include a vacuum pump (as shown), generator, compressor, idler, external water pump, or other vehicle accessory device that is commonly driven by a belt drive of an engine. A belt 34 is connected between the drive pulley 20 and the driven pulley 32 for driving the accessory 30. The belt 34 has a load direction "A" that extends through the axis of rotation of the drive pulley 20 and the driven pulley 32. The belt 34 needs to be tensioned in the load direction "A" for proper operation. The accessory 30 includes a housing 36 having a first mounting slot 38 and a second mounting slot 40 that are each generally parallel to the load direction "A" and each receive a threaded fastener 42 that can be tightened to secure the accessory 30 in the tensioned condition.

Figure 2:
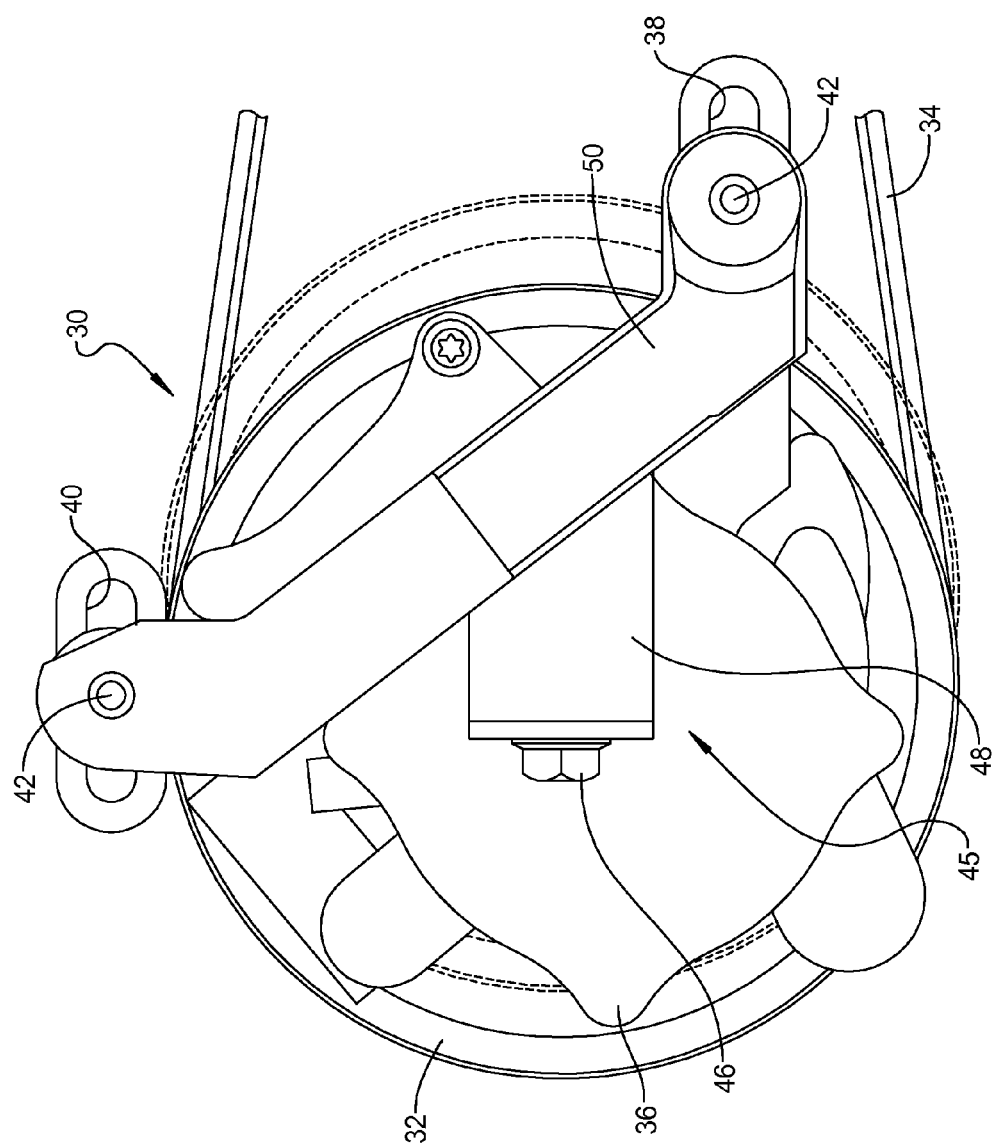
FIG. 2 is a rear plan view of the accessory mounted to the engine according to the principles of the present disclosure.

In order to install the belt 34, the fasteners 42 in the mounting slots 38, 40 can be loosened so that the accessory device 30 can be slid along the mounting slots 38, 40 in the direction of the drive pulley 20. Once the belt 34 is loosely placed on the drive and driven pulleys 20, 32, the housing 36 of the accessory 30 can then be pulled along the load direction "A" so that the mounting slots 38, 40 traverse straight along the loosened threaded fasteners 42. The accessory housing 36 can be provided with a tensioning mechanism 45 including a tensioning bolt 46 as illustrated in FIG. 2 that is aligned with the load direction "A" and allows the tensioning bolt 46 to be tightened to thereby tension the belt 34 as desired and correctly position the accessory 30. When the belt 34 is properly tensioned, the fasteners 42 received in each of the elongated mounting slots 38, 40 can then be tightened so that the accessory 30 is held in an appropriate position with the belt 34 properly tensioned.

Figure 3:
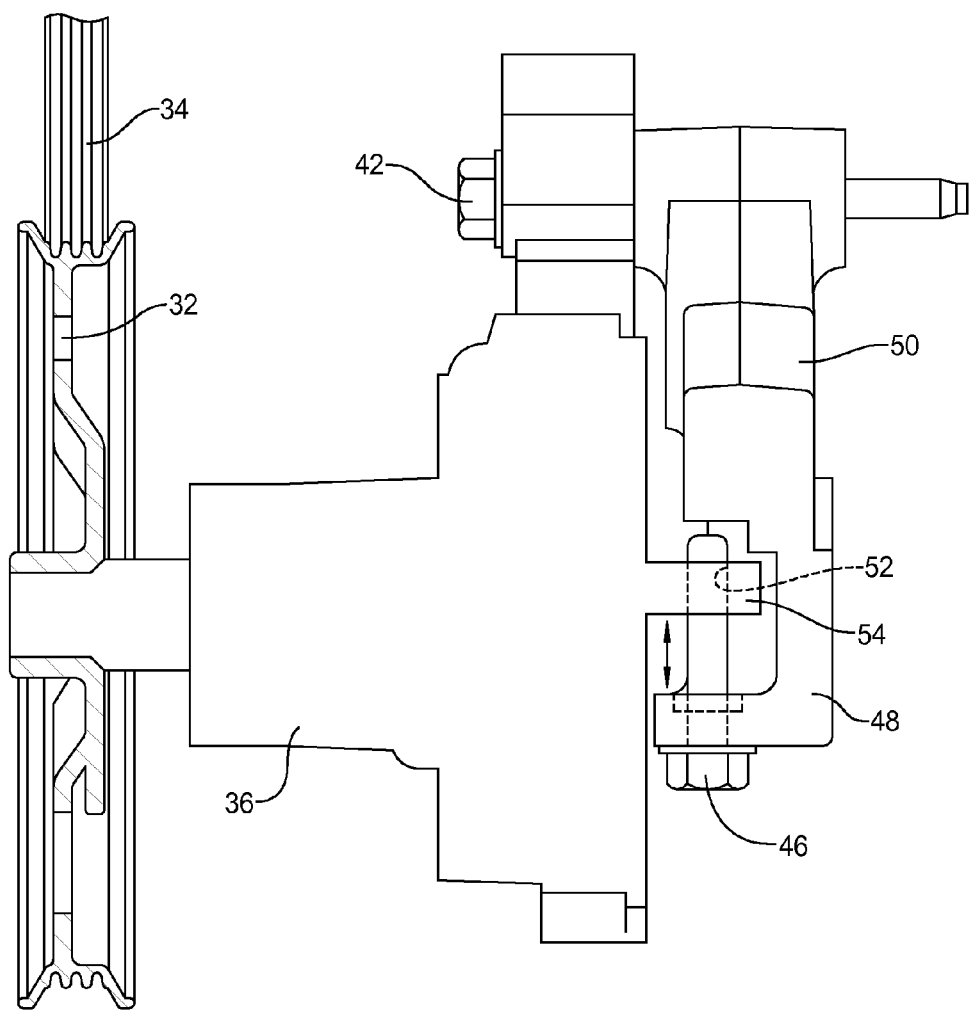
FIG. 3 is a cross-sectional view of the tensioning mechanism according to the principles of the present disclosure.

The belt tensioning bolt 46 can be received in a housing 48 of a mounting arm structure 50 that is mounted to the engine structure 12. With reference to FIG. 3, the tensioning bolt 46 can be threadedly engaged with a threaded hole 52 in a tab 54 on the housing 36 of the accessory 30. As the tensioning bolt 46 is tightened, the threaded connection to the tab 54 causes the tab 54 to move in the load direction of the belt 34. The head of the tensioning bolt 46 seats against the housing 48 so that as the bolt 46 is turned, the tab 55 is caused to move toward or away from the head depending upon the direction of rotation of the bolt 46. The tensioning bolt 46 can be located at a midpoint between the mounting slots 38, 40 or can be located offset from the midpoint for balancing purposes if the weight of the accessory is imbalanced.

The belt 34 can be a low modulus belt that stretches and once tensioned into position never needs to be re-tightened for its entire life. Prior stretch belts are stretched over fixed position pulleys that can cause damage to the belt. The present disclosure provides a system and method that tightens the belt to the stretch requirement (approximately 5% of belt length) which puts the slots as far against the slot bolts as possible and it is locked in place there.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An engine comprising:
an engine structure defining a plurality of cylinders;
a crankshaft rotatably mounted to said engine structure;
a plurality of pistons each disposed in a corresponding one of said plurality of cylinders and drivingly connected to said crankshaft;
a drive pulley drivingly connected to said crankshaft;
an accessory mounted to said engine structure and including a driven pulley connected to said drive pulley by a belt;
said belt having a load direction through an axis of rotation of said drive pulley and said driven pulley;
said accessory including a housing having two slots extending generally parallel to said load direction of said belt and each receiving a fastener therein and having a tensioner bolt located between said two slots and extending generally parallel to said load direction.

2. The engine according to claim 1, wherein said driven pulley is disposed on a first side of said housing of said accessory and said tensioner bolt is on a second side of said housing of said accessory opposite said first side.

3. The engine according to claim 1, wherein said accessory is a water pump.

4. The engine according to claim 1, wherein said accessory is a compressor.

5. The engine according to claim 1, wherein said accessory is a generator.

6. The engine according to claim 1, wherein said tensioner bolt is located at a midpoint between said two slots.

7. An engine accessory for mounting to an engine and connected to a drive pulley of the engine by a belt, comprising:
a housing supporting a driven pulley, said housing having two parallel mounting slots extending generally parallel to a load direction of the belt and a tensioner bolt located between said two parallel mounting slots and extending generally parallel to said load direction of the belt.

8. The engine accessory according to claim 7, wherein said driven pulley is disposed on a first side of said housing and said tensioner bolt is on a second side of said housing opposite said first side.

9. The engine accessory according to claim 7, wherein said accessory is a vacuum pump.

10. The engine accessory according to claim 7, wherein said accessory is a compressor.

11. The engine accessory according to claim 7, wherein said accessory is a generator.

12. The engine accessory according to claim 7, wherein said tensioner bolt is located at a midpoint between said two mounting slots.

13. A method of tensioning a belt of an engine accessory, comprising:
   providing a housing of the engine accessory with two mounting slots;
   inserting a pair of fasteners in a respective one of said mounting slots and into a respective threaded opening in an engine structure;
   putting a belt over a drive pulley of the engine and a driven pulley of the accessory;
   tensioning the belt by sliding the housing so that the mounting slots traverse along the fasteners; and
   tightening the pair of fasteners to secure the housing to the engine structure.

14. The method according to claim 13, wherein said tensioning the belt includes tightening a tensioner bolt that causes the housing to move away from the drive pulley.

15. The method according to claim 13, wherein said accessory is a vacuum pump.

16. The method according to claim 13, wherein said accessory is a compressor.

17. The method according to claim 13, wherein said accessory is a generator.

18. The method according to claim 13, wherein said tensioner bolt is located at a midpoint between said two mounting slots.

* * * * *